US006792547B1

(12) United States Patent
Murata et al.

(10) Patent No.: US 6,792,547 B1
(45) Date of Patent: Sep. 14, 2004

(54) DIGITAL INTEGRATED APPARATUS, IMAGE INPUT-OUTPUT SYSTEM, AND USER AUTHENTICATION METHOD

(75) Inventors: Kazuyuki Murata, Kyoto-fu (JP); Hideyuki Kuwano, Osaka-fu (JP); Takehito Yamaguchi, Osaka-fu (JP); Yuji Okada, Hyogo-ken (JP); Naoki Takahashi, Osaka-fu (JP); Joji Tanaka, Osaka-fu (JP); Kenji Hisatomi, Osaka-fu (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/559,580

(22) Filed: Apr. 28, 2000

(30) Foreign Application Priority Data

Apr. 30, 1999 (JP) .......................................... 11-123711

(51) Int. Cl.⁷ .............................................. G06F 17/00
(52) U.S. Cl. ...................... 713/202; 213/200; 213/201; 213/182; 213/184
(58) Field of Search ................................ 713/200–202, 713/182–186; 380/243–246, 255–256

(56) References Cited

U.S. PATENT DOCUMENTS

| 5,887,088 A | | 3/1999 | Kurokawa et al. |
| 6,148,091 A | * | 11/2000 | DiMaria ...................... 713/186 |
| 6,516,416 B2 | * | 2/2003 | Gregg et al. ................. 713/201 |
| 6,725,383 B2 | * | 4/2004 | Kyle ........................... 713/202 |

FOREIGN PATENT DOCUMENTS

JP 10-308868 11/1998

OTHER PUBLICATIONS

Graham, Authenticating public access networking, Proceedings of the 30th annual ACM SIGUCCS conference on User services, Nov. 2002, pp. 247–248.*

Zhang et al., Best poster papers from MobiHoc 2002: Virtual operator based AAA in Wireless LAN hot spots with ad–hoc networking aupport, ACM SIGMOBILE Mobile Computing and Communications Review, pp. 10–21.*

Samar, Unified login with pluggable authentication modules (PAM), Proceedings of the 3rd ACM conference on Computer and Communications security, Jan. 1996, pp. 1–10.*

* cited by examiner

*Primary Examiner*—David Jung
(74) *Attorney, Agent, or Firm*—McDermott Will & Emery LLP (57) ABSTRACT

The invention relates to a digital integrated apparatus capable of registering and fetching image data, and has an object to solve various problems resulting from the necessity of the user authentication at the time of using the apparatus. Specifically, it is arranged that, the display-input control means 92a classifies the user authentication under the first user authentication in a specific level and the second user authentication in a lower level than the first one, and then judges based on the initial setting whether the result of the second user authentication is valid or not. The first user authentication is based on the attribute of user's personal information including a user registration card Ku, and the second user authentication is based on the user ID and password inputted from the control panel 92. Therefore, it is possible to limit the fetching by using the other person's user ID and password.

21 Claims, 6 Drawing Sheets

For several years, Mrs. H. T. Miller had lived alone in a pleasant apartment (two rooms with kitchenette) in a remodelled brown stone near the East River. She was a widow: Mr. H. T. Miller had left a reasonable amount of, and she rarely were narrow, she had no friends to speak of, and she rarely journeyed farther than the corner grocery. The other people in the house never seemed to notice her: her clothes were matter-of-fact, her hair iron-gray, clipped and casually waved; she did not use cosmetics, her features were plain and inconspicuous, and on her last birthday she was sixty-one. Her activities were seldom spontaneous: she kept the two rooms immaculate, smoked an occasional cigarette, prepared her own meals and tended a canary.

Then she met Miriam. It was snowing that night. Mrs. Miller had finished drying the supper dishes and was thumbing through an afternoon paper when she saw an advertisement of a picture playing at a neighbourhood theatre. The title sounded good, so she struggled into her beaver coat, laced her galoshes and left the apartment, leaving one light burning in the foyer: she found nothing more disturbing than a sensation of darkness.

The snow was fine, falling gently, not yet making an impression on the pavement. The wind from the river cut only at street crossings. Mrs. Miller hurried, her head bowed, oblivious as a mole burrowing a blind path. She stopped at a drugstore and bought a package of peppermints.

A long line stretched in front of the box office; she took her place at the end. There would be (a tired voice groaned) a short wait for all seats. Mrs. Miller rummaged in her leather handbag till she collected exactly the correct change for admission. The line seemed to be taking its own time and, looking around for some distraction, she suddenly because conscious of a little girl standing under the edge of the marquee.

Her hair was the longest and strangest Mrs. Miller had ever seen: absolutely silver-white, like an albino's. It flowed waist length in smooth, loose lines. She was thin and fragilely constructed. There was a simple, special elegance in the way she stood with her thumbs in the pockets of a tailor plum-velvet coat.

Mrs. Miller felt oddly excited, and when the little girl glanced toward her, she smiled warmly. The little girl walked over and said, "Would you care
to do me a favour?"

Fig.3

| Document ID | No. of sheet | Data size | Registration method | Registration date | Registration time | User ID | Access right | Media ID |
|---|---|---|---|---|---|---|---|---|
| 00000001 | 3 | A4 | COPY | 1997.01.29 | 20:10:45 | 0003 | OWNER | 0000 |
| 00000002 | 4 | B4 | FAX RECEIVE | 1997.02.01 | 06:05:05 | 0000 | FREE | 0000 |
| 00000003 | 6 | A4 | FAX SEND | 1997.02.01 | 09:17:55 | 0006 | GROUP | 0000 |
| 00000004 | 3 | A4R | PRINT | 1997.02.03 | 10:10:09 | 0003 | GROUP | 0001 |
| 00000005 | 3 | A4R | COPY | 1997.02.03 | 11:30:30 | 0003 | GROUP | 0000 |
| | | | | | | | | |

DIGITAL INTEGRATED APPARATUS, IMAGE INPUT-OUTPUT SYSTEM, AND USER AUTHENTICATION METHOD

BACKGROUND OF THE INVENTION

1. Field of the Invention

This invention relates to a digital integrated apparatus, and more specifically to the digital integrated apparatus capable of registering a and fetching image data.

2. Background

Figure 1:
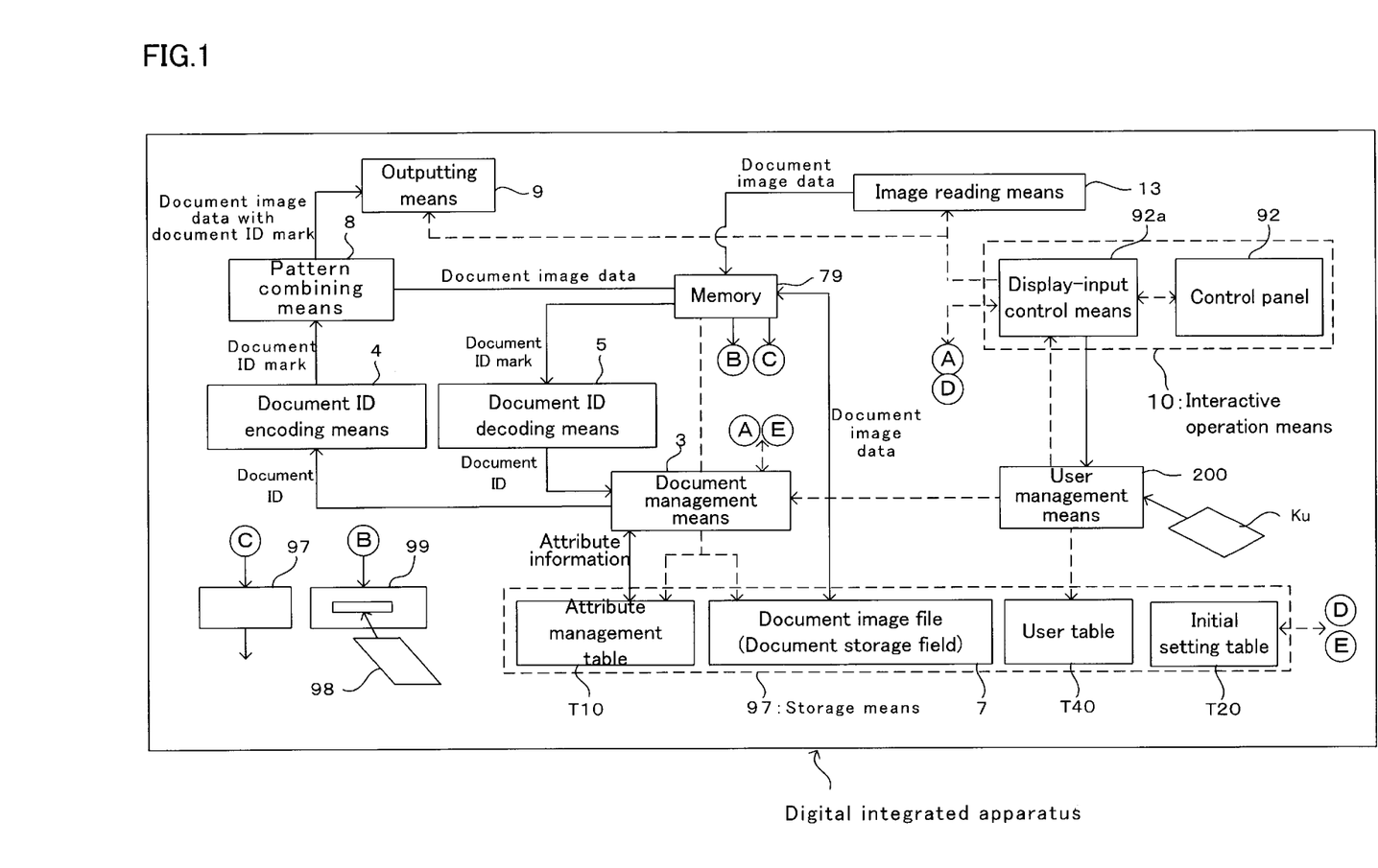
FIG. 1 is a schematic functional block diagram showing a digital integrated apparatus adopting the invention.

FIG. 1 shows an schematically function al block diagram of a digital integrated apparatus disclosed in the Japanese Patent Laid Open Publication No. H10-308868 and the construction are explained hereafter referring to the operations.

First, when a user registers and fetches a document in the way described later, it needs to authenticate whether the user can use the apparatus or not. Specifically, in a user table T40 of storage means 97 users that can use the apparatus should be registered in advance according to the procedures described later. Under said conditions, after inserting a user registration card Ku including the user's name, user's post, user ID, and etc. into a card reader/writer installed in the apparatus (nor provided separately), user management means 200 reads the content of the card Ku and then judges whether the user has been registered in the user table T40. Only when registered, the user can use the apparatus.

The user is registered into the user table T40 when the user registration card Ku is prepared. Instead of the input by using the user registration card Ku, the user ID can be inputted by using the ten key of the control panel 92 and thereby it can be obtain the same effect. Nevertheless, the copying processing (not including other functions) does not need the user authentication.

After authenticate the user as above, the user is allowed to execute the next processing such as the document registration.

Figure 5:
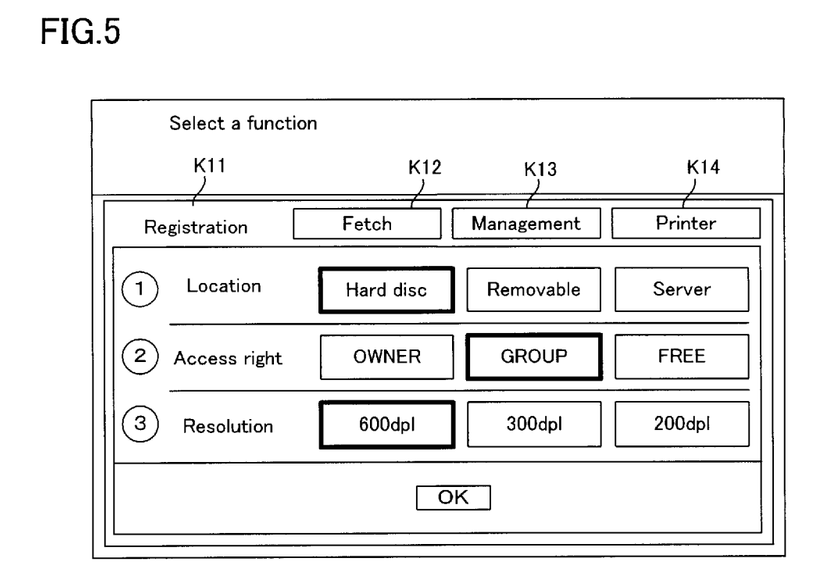
FIG. 5 is a diagram showing the state of the control panel at the time of selecting the kind of the function.
Figure 6:
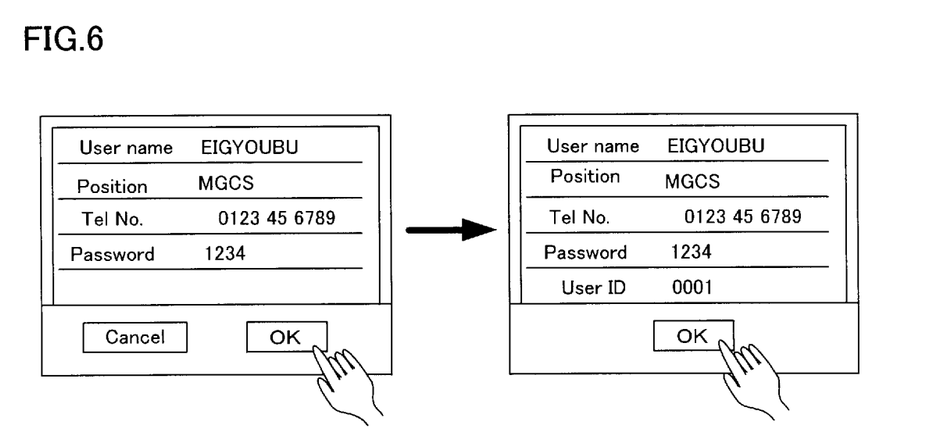
FIG. 6 is a diagram showing the state of the control panel at the time of the user registration.

Specifically, while placing document papers, that are papers on which document is written, on an auto document feeder (which is called ADF hereinafter) providing with image reading means 13 such as a scanner, the user inserts the user registration card Ku to the card reader/writer (otherwise, inputs the user ID from ten key), and selects a "Registration" key from the function key K11 to K14 (see FIG. 5). Next, the image reading means 13 converts the content of the document papers sent one after another by the ADF to document image data and stores them in a memory 79.

Figure 2:
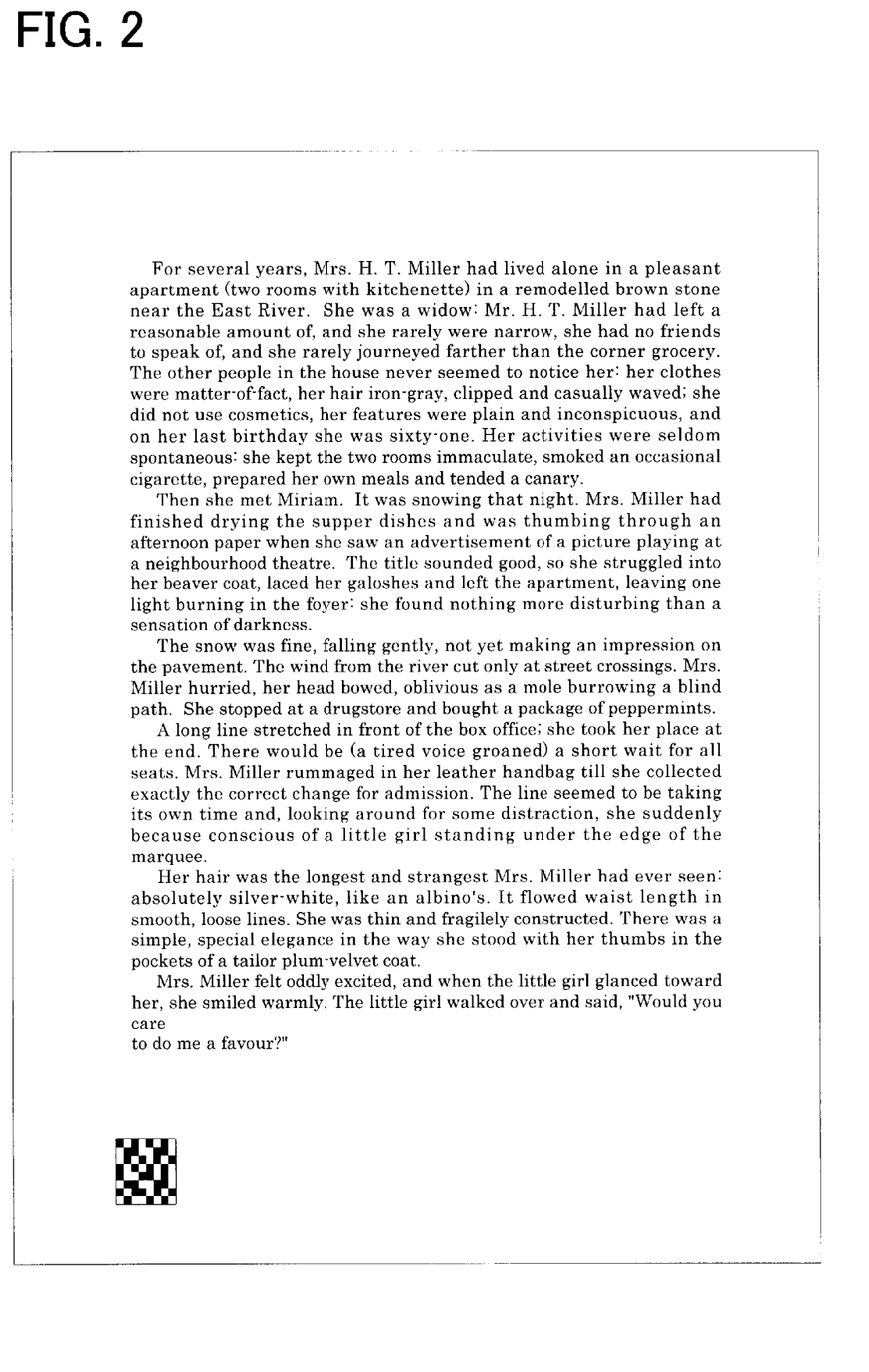
FIG. 2 is a diagram showing a marked sheet.

After storing the document image data in the prescribed way, document management means 3 issues a unique document ID. And then, while registering the document image data in the storage means 97 (for example, a hard disc, and etc.) as a document image file 7 having a file name corresponding to the document ID, the document management means 3 sends the document ID to document ID encoding means 4. The document ID encoding means 4 prepares a document ID mark corresponding to the document ID and handles it to pattern combining means 8. Thereby, the pattern combining means 8 prepares a document image data attached with the document ID mark (which is called a "marked sheet image data" hereinafter) by combining the document ID mark and a specific page of the document image data (the first page or a page including characteristic image). The combined image data is sent to output means 9 such as a printer, for example. As a result, the marked sheet shown in FIG. 2 is printed out by the output means 9.

Figure 3:
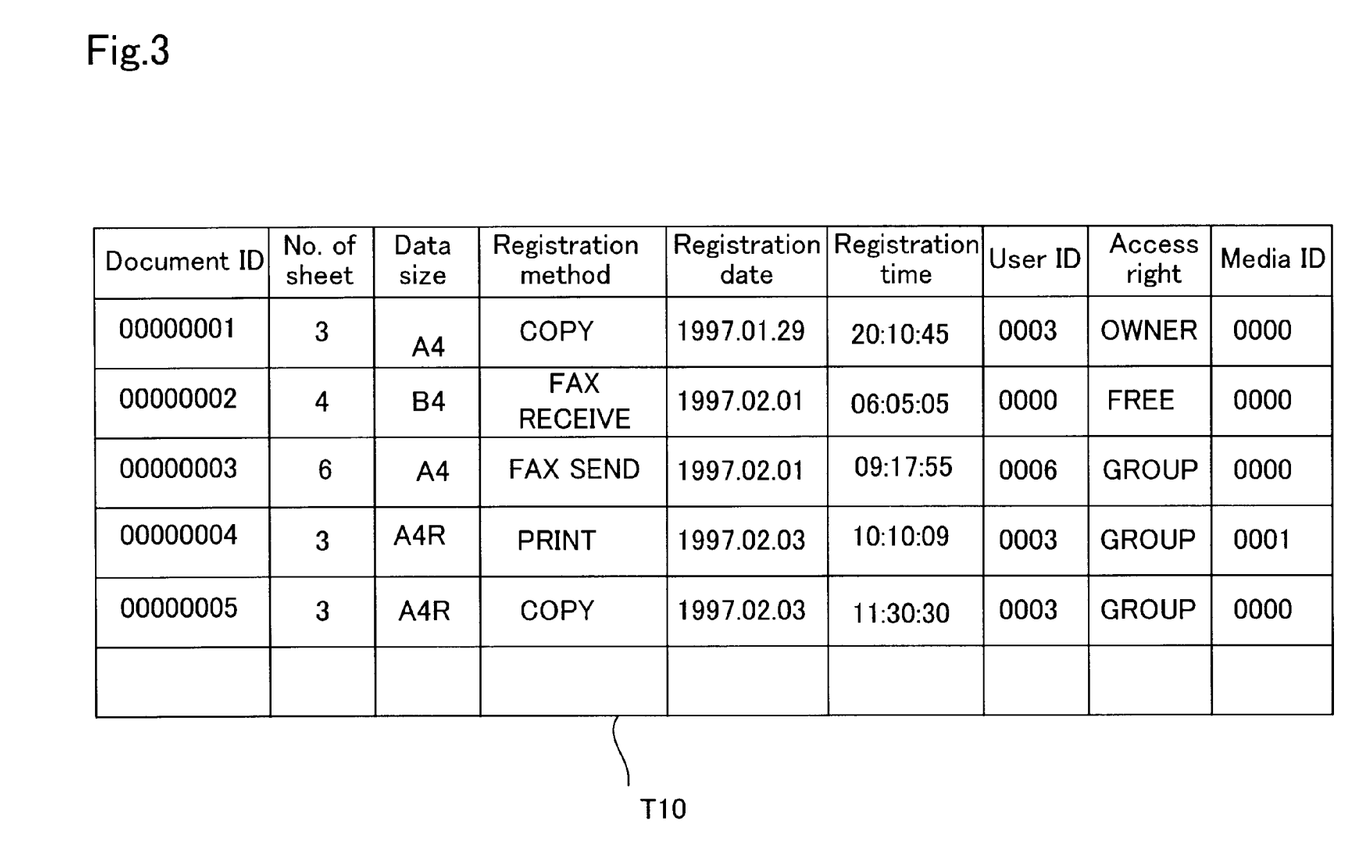
FIG. 3 is a diagram showing an example of the attribute management table.

At the time of registering the document image data as described above, the document management means 3 is arranged to register attribute information of the document image data on the attribute management table T10 as shown in FIG. 3. The attribute information comprises the number of sheets, data size, registration ways (a simple registration without the copying, a registration with the copying, a registration with facsimile transmission, a registration with facsimile receiving, and a registration based on the input from a computer), registration date, registration time, user ID, and access right regarding the registered document, in addition to the document ID.

The access right comprises "OWNER" that is to give an access right only to a user that has registered the document image data, "GROUP" that is to give an access right to users registered in the apparatus as described later, and "FREE" that is to give an access right to anyone. These kinds of access rights can be selected from the control panel 92 at the time of document registration except the facsimile receiving (See FIG. 5 ②).

It may use as the storage means 97 a hard disc installed in the apparatus, a removable media inserted into the drive 99 provided in the apparatus, or a sever connected with the apparatus via LAN, etc. The kind of the storage means 97 can be indicated as a media ID on the attribute management table T10 shown in FIG. 3.

The document image data thus stored can be fetched as follows. That is to say, when the marked sheet is placed on the ADF and a "Fetch" key of the function key K11 to K14 (See FIG. 5) is selected, the image reading means 13 converts the marked sheet to the marked sheet image data and stores it in the memory 79. After storing the marked sheet image data as above, the document management means 3 instructs document ID decoding means 5 to start the decoding. The document ID decoding means 5 received the instruction decodes the image data of the document ID mark included in the marked sheet image data to a document ID, which is handled to the document management means 3. Accordingly, the document management means 3 confirms the access right and the document ID in a way described later, and fetches the document image data corresponding to the document ID from the storage means 79, and then the document image data is handled to the output means. As a result, the document papers corresponding to the marked sheet are printed out by the output means 9.

Under these conditions arranged above, the user do not need to perform complicated operations such as the input and instruction by using the ten key of the control panel 92, and can fetch the necessary document image data as the document papers.

Here, the image reading means 13 is used as an input resource of the document image data (document image inputting means), but it is possible to use facsimile receiving means for receiving image data from a facsimile machine or print image receiving means for receiving image data from a computer as the input resource. And the document image data fetched from the storage means 97 can be outputted not only to a printer provided in the apparatus, but also to a remote facsimile machine, or to a printer connected via network. Moreover, the document image data registered in the hard disc as above can be copied or transferred to the other recording media (for example, a removable media such as an optical magneto disc).

By the way, when a user is going to access to a specific document image data as above, he must select the document image data as an object of access.

Figure 4:
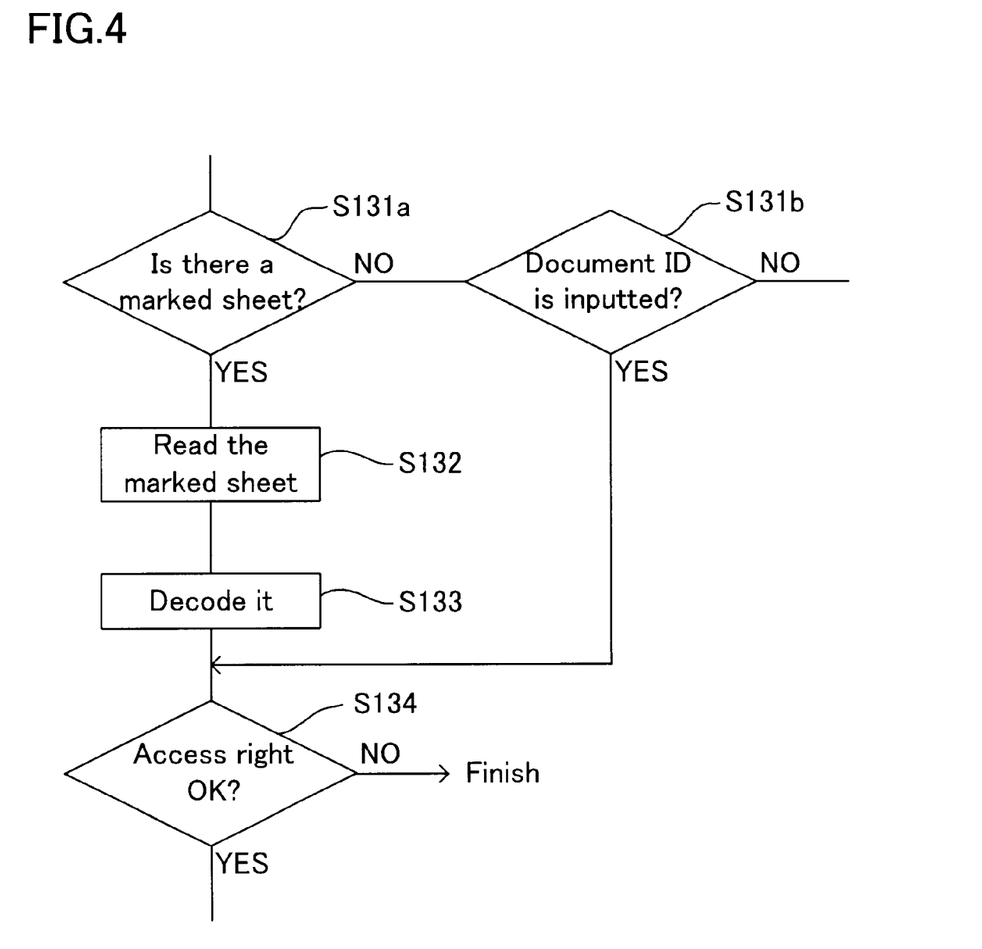
FIG. 4 is a flowchart showing the confirmation processing of the access right for the document image data.

Specifically, when the marked sheet is placed on the ADF as shown in FIG. 4, the document ID is obtained by decoding the document ID of the marked sheet (Step S131*a* to S132 to S133). On the other hand, when the marked sheet is not placed on the ADF, the document ID is obtained by inputting from the ten key of the control panel 92 (Step S131*a* to S131*b*).

Next, according to the document ID thus obtained, it is checked whether the user has a right to access the document image data (Step S134). In addition, in case it is determined that the user has the access right, the user can access to the specified document image data (that is, the document image data of the document ID).

However, since the prescribed conventional apparatus is arranged that the user ID can be also inputted from the control panel 92, even when the user does not carry the user registration card Ku, the user can activate the apparatus. Therefore, the person who gets to obtain the other person's user ID and password in some way can access easily to the document image data of the other person by using them. This point becomes a problem in the security.

And further in the conventional apparatus it is possible to use the apparatus in the restricted field (the copying, for example) without using the user registration card Ku, but it is impossible to execute the extension functions other than the copying (for example, the document registration) without the use of the user registration card Ku basically. Accordingly, at the time of registering the document, even if the document is not under the tight security, the user needs the user registration card Ku. In addition, because of this reason, it sometimes occurs that the operation becomes complicated.

SUMMARY OF THE INVENTION

Considering the conventional problems, the present invention has an object to solve various problems resulting from the necessity of the user authentication at the time of using the apparatus.

Specifically, the invention presupposes a digital integrated apparatus as shown in FIG. 1, for adding a document ID to a document image data corresponding to a specific document inputted by at least one kind of document image inputting means 13 in order to specify the document image data, for registering them in at least one kind of storage means, for managing them according to the attribute information including the document ID by document management means 3. In addition, if necessary, outputting means 9 outputs the selected document according to the document ID, and it is possible to perform the user authentication. The apparatus is provided with display input control means 92*a*, after classifying the user authentication under the first user authentication in a specific level and the second user authentication in a lower level than the first one, for judging based on the initial setting whether the result of the second user authentication is valid or not. The first user authentication is based on the personal attribute of user information including the user registration card Ku, and the second user authentication is based on the user ID and password inputted from the control panel 92. Therefore, it is possible to limit the fetching by using the other person's user ID and password.

In addition, the apparatus may be arranged that, after authenticating the user, display input controller 92 prompts a user to select an object digital integrated apparatus by displaying a list of the digital integrated apparatus connected via network. Accordingly, a user can select and use an object apparatus from the arbitrary apparatus.

And further the apparatus may be arranged that, without performing the user authentication, the document management means 3 judges based on the initial setting whether a user can use various functions provided in the digital integrated or not. Therefore, it is possible to prevent the meaningless high security given the document image data without necessary of so much security.

Moreover, the document management means 3 may be arranged to set the access right to the document image data registered without according to the initial setting.

And user manage means 200 may be provided in order to change OWNER of the registered document image data to another user, and when the user management means 200 deletes a user, the document management means 3 delete the document registered by the user. Thereby, it is possible to prevent from leaving the unnecessary document image data in the storage means 97.

BRIEF DESCRIPTION OF THE INVENTION

DETAILED DESCRIPTION OF THE INVENTION

FIG. 1 is a schematic functional block diagram showing a digital integrated apparatus adopting the invention, and the construction are explained hereinafter regarding the points different from that of the prescribed conventional apparatus.

Embodiment 1

The storage means 97 is provided with an initial setting table T20 for setting the functions of this apparatus in addition to the following items, and a user can change the setting value even though the default setting was made at the shipping of the factory.

This apparatus is essentially provided with a copying function, so that any user can use the apparatus at the time of the copying regardless of the following user ID.

When an extension key of the control panel 92 (not shown) is touched on, the function in the apparatus may be transferred to the function to be secured such as "Registration", "Fetch" and "Management". Specifically, when the extension key is touched on, the screen displays as shown in FIG. 5 the keys such as "Registration" K11, "Fetch" K12 and "Management" K13, and this is the state that the default function ("Registration" K11, for example) is selected.

In case that one of keys corresponding to other object functions excluding the default function is touched on, the function in the apparatus may be transferred to the object function. And when the step changes to the document registration processing by touching the "Registration" on (otherwise, the default function is the "Registration"), display-input control means 92a prompts the user to insert the user registration card Ku to the card reader/writer, or to input the user ID from the ten key of control panel 92. Therefore, anyone who gets to know the other person's user ID and password in some way can register the document by using the other person's user ID and password. However, this remains a problem whether such case is acceptable or not.

To solve the above problem, the invention is arranged that, when the user ID is inputted by using the ten key, the determination whether thus inputted user ID is allowable or not can be set on the initial setting table T20. Specifically, when the user ID is inputted by using the ten key, the display-input control means 92a refers to the initial setting table T20, and in case of prohibiting the input of the user ID from the ten key, indicates a message that the user ID cannot be allowed to use the apparatus. In addition, from now on, it is arranged to prohibit the input of the function key K11 to K14.

As explained above, it is possible in the invention of this embodiment to prohibit the access to the document image data of the other user by using the ten key, and to reinforce the security.

In the invention, the data sharing can be designed by interconnecting with a plurality of apparatuses each other via LAN controller 97. In addition, when a plurality of apparatuses is connected with each other via network, it is necessary to input not only the user ID but also the device ID as the information specifying the object device. In this case, the user registration card Ku is arranged to also include the device ID. After the card reader/writer reads the user registration card Ku, the object device can be specified. According such arrangement, the user can use the object device from an arbitrary device connected via network.

However, since it is arranged to input the device ID at the same time of inputting the user ID and password from the control panel 92, if the user cannot input them accurately, it causes the trouble. Therefore, when the user ID and password is inputted from the control panel 92, it is preferable that the user is allowed to use the apparatus which he is working and selects the object apparatus by himself from a list of the apparatuses connected with network, the list displayed on the control panel 92 by the display-input control means 92a. Thereby, without using the user registration card Ku, it is possible to use the object apparatus from the arbitrary apparatus connected via network.

Figure 7:
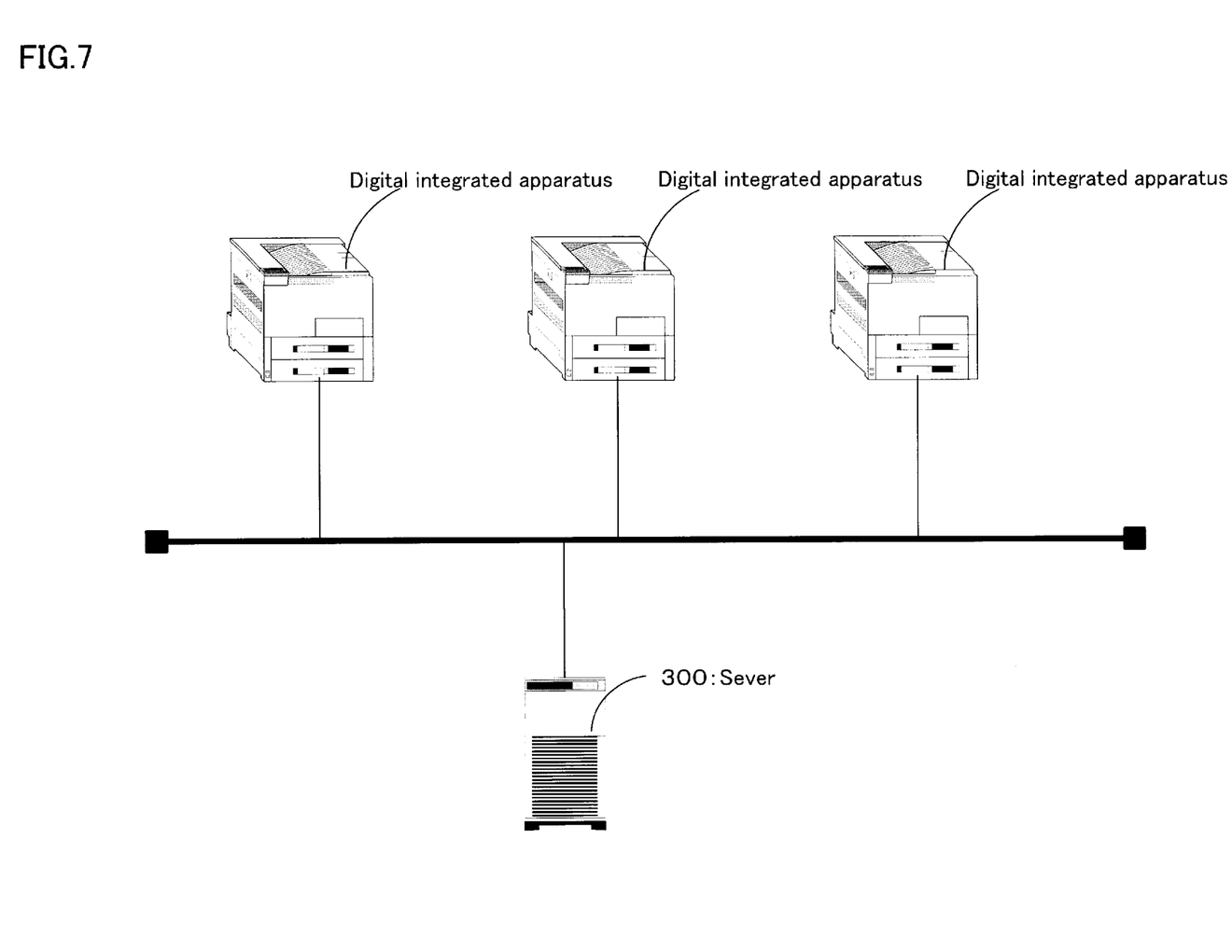
FIG. 7 is a diagram showing the network construction of the image input-output system adopting the invention.

It is arranged in this embodiment that each digital integrated apparatus manages the document image data respectively, but the invention is not always restricted to this. For instances, it may be arranged as shown in FIG. 7 that the document image data are centralized and managed by a server 300 connected via LAN controller 97. It is possible to carry out such centralized management by using the unique information of the document image data in the image input-output system (which is called an "image ID" hereafter), for example, the information comprising the device ID and the document ID. Specifically, the registration of the document image data can be carried out by selecting the image ID and sending to the server 300 the document image data to be registered. On the other hands, the fetching of the document image data can be carried out by sending to the server 300 the fetching instruction including the selected image ID. Accordingly, such image input-output system does not need the operation for selecting the object apparatus from the list, and each digital integrated apparatus does not need to provide with the mass storage means 97.

Embodiment 2

It is general that the extension function needs the user authentication as described above. But, if all of the functions need the user authentication, the user is required to insert the user registration card Ku or to input the user ID from the ten key even though the function without the security. This makes the operation troublesome.

Therefore, it is arranged in this embodiment that it is possible to set on the initial setting table T20 whether the document registration can be performed without the user authentication. That is to say, in order to carry out the document registration without the user authentication, the cancel key K1O that is not shown is touched on when the control panel 92 requests the input of the user ID, and the display-input control means 92a issues the allowance of the document registration to the document management means 3. Thereby it is possible to perform the document registration processing. At this time, the access right is "FREE (anyone can access)", and the document management means 3 sets "FREE" in the field of the access right of the attribute management table T10.

In addition, although the access right of the document image data registered without the user authentication is "FREE", the kind of the access right can be changed. Specifically, it is arranged to set the kind of the access right "FREE" or "GROUP" on the initial setting table T20, in case of selecting the "GROUP", the document image data registered without user authentication changes the access right from "FREE" to "GROUP". This means the status that the access right is given only to the user registered in the apparatus.

Embodiment 3

As described above, the invention presupposes that the user registration card Ku is prepared. The user registration card Ku is prepared according to the following steps; first, a user inserts the unregistered card to the card reader/writer, inputs the user name, the post, the telephone number, and the password, for example, and then touches the OK key on. Thereby the user information is registered in the user table T40 by the user management means 200. Moreover, the users registered in a same apparatus constitute "GROUP" in the attribute management table T10 that is shown in FIG. 3.

In case of deleting a specific user, there is a trouble in the management of the document image data registered by the user. Since the document image data thus registered will not be available from now on, it is not preferable to remain the data in the storage means 97.

Therefore, the invention is arranged that, while selecting the user delete mode (not shown) from the control panel 92, a user inserts the user registration card Ku to the card reader/writer (or input the user ID and password from the ten key), and then touches the OK key on. Thereby the user delete instruction may be sent from the control panel 92 to the user management means 20. According to the instruction, the user management means 200 deletes the selected user from the user table T40 and informs the document management means 3 of the user ID. The document management means 3 received the notification extracts the document with the user ID from the attribute management table T10 and deletes the corresponding document image data from the storage means 97.

When there is any change in the present status of the user (his position etc.), the user registration card Ku must be corrected in the contents. That is, after selecting the user information change mode (not shown) from the control panel 92, a user inserts the user registration card Ku to the card reader/writer (or, inputs the user ID and password by the ten key). Thereby the user management means 200 displays the contents of the registered user on the control panel 92. And regarding the item to be changed, the user inputs the modification by the ten key, and then touches the OK key on, thereby the contents of the user registration card Ku is changed and at the same time, the changed contents is registered on the user table T40.

After selecting the user information change mode, when the user inputs the user ID and password by the ten key (that is, in case of not using the user registration card Ku), the contents to be registered should be written into a new user registration card Ku (a non-registered card). Accordingly, although there are two cards of an old user registration card Ku and a new one Ku, but the user ID has not be changed in this case, therefore, the user can use whichever the old user registration card or the new one.

Embodiment 4

The above apparatus adopting the invention can access to the removable media. The management of the removable media is entrusted to the user himself that owns the removal media. Therefore, it can be considered that there is no need to protect the access right to the removal media. In case of accessing to the removal media, the document management means 3 is arranged to nullify the result of the user authentication.

The above case does not need the user authentication, but in case of transferring the document image data from the hard disc to the removal media or to the server 300, or in case of deleting the document image data, it is arranged to confirm whether the user has the access right or not.

Other Embodiments

In case the user that registered the document image data does not use the apparatus any more, or there is unnecessary document image data, the administrator of the apparatus (a super user) must delete or transfer the unnecessary document image data. It is arranged that the apparatus administrator can execute the specific functions (for example, the delete or the transfer), which are restricted to the general users, by the administrator-only ID card or by the special operation.

Since in the above explanation the registration and management of the user is executed in the apparatus, if the apparatus is connected with a plurality of apparatuses and the server 300 via network, a plurality of users using a plurality of apparatuses must be managed all together. In this case, the users using a plurality of apparatuses can be registered all together in the server 300 and then managed.

In the above explanation, the authentication based on the user registration card Ku is taken as an example of the user authentication in a specific level (the first user authentication). On the other hand, the authentication based on the user ID and password inputted from the control panel 92 is taken as an example of the user authentication in the lower level (the second user authentication). The user authentication applicable to the invention is not restricted to those. That is, it is possible to apply the authentication based on the attribute of the user, such as the voiceprint authentication or the fingerprint authentication, as the first user authentication.

The invention is applied to the digital integrated apparatus in the above description, but it is needless to say that the invention can be applied to the digital apparatus that can perform the user authentication (for example, a personal computer).

What is claimed is:

1. A digital integrated apparatus for adding a document ID to a document image data corresponding to a specific document inputted by at least one kind of document image inputting means in order to specify the document image data, registering them in at least one kind of storage means, managing attribute information including the document ID by document management means, outputting on demand the selected document based on the document ID by outputting means, and performing user authentication, the apparatus comprising:

display-input control means for classifying the user authentication under a first user authentication in a specific level and a second user authentication in a lower level than the first one, and for judging based on an initial setting whether the result of the second user authentication is valid or not; wherein the first user authentication is executed based on authentication information in a removable memory, and the second user authentication is executed based on authentication information inputted by the user.

2. A digital integrated apparatus as defined in claim 1, wherein the first user authentication is based on an attribute of the user's personal information including a user registration card.

3. A digital integrated apparatus as defined in claim 1, wherein the second user authentication is based on a user ID and a password inputted from a control panel.

4. A digital integrated apparatus for adding a document ID to a document image data corresponding to a specific document inputted by at least one kind of document image inputting means in order to specify the document image data, registering them in at least one kind of storage means, managing attribute information including the document ID by document management means, outputting on demand the selected document based on the document ID by outputting means, and performing user authentication, the apparatus comprising:

display-input control means for authenticating a user, and for prompting the user to select an object digital integrated apparatus for displaying a list of the digital integrated apparatus connected via a network.

5. A digital integrated apparatus for adding a document ID to a document image data corresponding to a specific document inputted by at least one kind of document image inputting means in order to specify the document image data, registering them in at least one kind of storage means, managing attribute information including the document ID by document management means, outputting on demand the selected document based on the document ID by outputting means, and performing user authentication, the apparatus comprising:

document management means, without performing the user authentication, for judging based on an initial setting whether a user can use various functions provided by the digital integrated apparatus or not.

6. A digital integrated apparatus as defined in claim 1, wherein the document management means sets, based on an initial setting, the access right to the document image data registered without performing the user authentication.

7. A digital integrated apparatus as defined in claim 1, further comprising user management means for changing a registered owner of document image data to another user.

8. A digital integrated apparatus as defined in claim 7, wherein the document management means deletes the document image data registered by the user, when the user management means deletes the user.

9. An image input-output system capable of performing user authentication comprising:

means for classifying the user authentication under a first user authentication in a specific level and a second user authentication in a lower level than the first one;

and means for selecting whether the result of the second user authentication is valid or not, wherein the first user authentication is executed based on authentication information in a removable memory, and the second user authentication is executed based on authentication information inputted by the user.

10. An image input-output system as defined in claim 9, comprising:

selecting at the time of an initial setting whether the result of the second user authentication is valid or not.

11. An image input-output system as defined in claim 9, wherein the first user authentication is based on an attribute of the user's personal information including a user registration card.

12. An image input-output system as defined in claim 9, wherein the second user authentication is based on a user ID and a password inputted from a control panel.

13. An image input-output system for adding a document ID to a document image data corresponding to a specific document inputted by at least one kind of document image inputting means in order to specify the document image data, registering them in at least one kind of storage means, managing attribute information including the document ID by document management means, outputting on demand the selected document based on the document ID by outputting means, and performing user authentication, the apparatus comprising:

display-input control means, after authenticating a use, for prompting the user to select an object digital integrated apparatus by displaying a list of digital integrated apparatus connected via a network.

14. An image-input-output system for adding a document ID to a document image data corresponding to a specific document inputted by at least one kind of document image inputting means in order to specify the document image data, registering them in at least one kind of storage means, managing attribute information including the document ID by document management means, outputting on demand the selected document based on the document ID by outputting means, and performing user authentication, which comprising:

document management means, without performing the user authentication, for judging based on an initial setting whether a user can use various functions provided in a digital integrated apparatus or not.

15. A user authentication method in a digital integrated apparatus capable of performing the user authentication, comprising:

classifying the user authentication under the first user authentication in a specific level and the second user authentication in a lower level than the first one, and then selecting whether the result of the second user authentication is valid or not; wherein the first user authentication is executed based authentication information in a removable memory, and the second user authentication is executed based on authentication information inputted by a users.

16. A user authentication method on a digital integrated apparatus as defined in claim 15, wherein the first user authentication is based on an attribute of user's personal information including the user registration card.

17. A user authentication method in a digital integrated apparatus as defined in claim 15, wherein the second user authentication is based on a user ID and a password inputted from the control panel.

18. An image output system for adding a document ID to a document image data corresponding to a specific document inputted by at least one kind of document image inputting means in order to specify the document image data, the system comprising:

a storage means for storing the image data and the document ID for specifying the image data;

a document management means for managing for managing attribute information including the document ID;

an outputting means for outputting the image data specified based on the attribute information;

a user authentication means for performing an alternative user authentication by judging if the user is allowed or not, the user authentication comprising a first user authentication and a second user authentication, the second user authentication having a lower level of authentication than the first user authentication;

a setting means for setting the first user authentication result to be valid, and setting the second user authentication result to be valid or not alternatively; and a control means for giving an allowance of use to a user when the user is authenticated by the first user authentication result, and when a user is authenticated by the second user authentication result, giving the user an allowance to use concerned with allowable functions by validating the authentication result, but prohibiting the user from using the other functions not allowable by invalidating the authentication result.

19. The image output system as defined in claim 18, wherein the setting means sets whether the result of the second user authentication is valid or not according to each function.

20. The image output system as defined in claim 18, wherein the copying function is set to be allowable to use without performing the user authentication, the other extension functions except the copying function is set to require to execute the user authentication by the user authentication means.

21. The image output system as defined in claim 20, wherein the extension functions are for executing the registration of the image data, the retrieval of the image data, and the management of the image data.

* * * * *